United States Patent
Conrad, Jr.

(10) Patent No.: US 9,867,340 B1
(45) Date of Patent: Jan. 16, 2018

(54) SELF-WATERING TWO-PIECE PLANTER

(71) Applicant: Michael L. Conrad, Jr., Bridgewater, NJ (US)

(72) Inventor: Michael L. Conrad, Jr., Bridgewater, NJ (US)

(73) Assignee: WaterWell Planters, Inc., Martinsville, NJ (US)

( * ) Notice: Subject to any disclaimer, the term of this patent is extended or adjusted under 35 U.S.C. 154(b) by 3 days.

(21) Appl. No.: 13/920,988

(22) Filed: Jun. 18, 2013

(51) Int. Cl.
*A01G 27/04* (2006.01)

(52) U.S. Cl.
CPC .................... *A01G 27/04* (2013.01)

(58) Field of Classification Search
CPC ...... A01G 27/00; A01G 27/005; A01G 27/02; A01G 27/04; A01G 27/06; A01G 9/028; A01G 9/02
USPC ............... 47/65.5, 66.1, 79, 80, 81, 87, 48.5
See application file for complete search history.

(56) References Cited

U.S. PATENT DOCUMENTS

| | | | |
|---|---|---|---|
| 1,778,030 A * | 10/1930 | Kanst ..................... | A01G 29/00 422/278 |
| 3,958,366 A | 5/1976 | Meyers | |
| 4,056,899 A | 11/1977 | Close | |
| 4,096,663 A * | 6/1978 | Silver ............................... | 47/80 |
| 4,299,054 A * | 11/1981 | Ware ................................. | 47/64 |
| 4,324,070 A * | 4/1982 | Swisher ........................... | 47/81 |
| 4,343,109 A | 8/1982 | Holtkamp | |
| 4,369,598 A * | 1/1983 | Beckwith ......................... | 47/61 |
| 4,506,899 A | 3/1985 | Sano et al. | |
| 4,562,959 A * | 1/1986 | Pointer, Jr. ............. | A01G 27/00 239/38 |
| 4,805,343 A * | 2/1989 | Patterson ............... | A01G 27/04 47/48.5 |
| 4,860,491 A | 8/1989 | Panuski | |
| 4,903,432 A * | 2/1990 | Velagaleti et al. ................ | 47/81 |
| 4,962,613 A | 10/1990 | Nalbandian | |
| 5,081,790 A | 1/1992 | Hinton | |
| 5,404,672 A | 4/1995 | Sanderson | |
| 5,535,542 A * | 7/1996 | Gardner et al. .................. | 47/18 |
| 5,749,170 A | 5/1998 | Furuta | |

(Continued)

FOREIGN PATENT DOCUMENTS

EP          2479352 A2 *   7/2012   ............. A01G 27/02

*Primary Examiner* — Lisa L Tsang
(74) *Attorney, Agent, or Firm* — M&B IP Analysts, LLC (57) ABSTRACT

A self-contained and low-maintenance two-piece planter providing significantly extended self-watering time for plants in an upper member supported by a fluid-containing lower member. An exterior indentation on the bottom perimeter edge of the upper member engages a small interior ledge positioned near the top edge of the lower member to provide a stable and readily-separable connection between upper and lower members. The upper member's bottom surface supports a fill-tube and has perforations covered by fluid-permeable material, and at least one wicking member is positioned on the material with an end extending through one of the perforations. Plants may be in pots supported by the upper member, or plants may be rooted in a growth/support medium distributed therein. No municipal power or water supply connections are used. Applications include, but are not limited to, daily self-watering of plants in residential homes, shopping malls, commercial buildings, hotels, convention centers, and college campuses.

12 Claims, 5 Drawing Sheets

(56) References Cited

U.S. PATENT DOCUMENTS

| | | | |
|---|---|---|---|
| 5,806,242 | A | 9/1998 | Park |
| 5,901,497 | A | 5/1999 | Bulvin |
| 5,930,951 | A | 8/1999 | Wong |
| 6,202,348 | B1 | 3/2001 | Reiger |
| D441,315 | S * | 5/2001 | Huffman ............... D11/143 |
| 6,516,563 | B1 | 2/2003 | Matthews |
| 7,296,379 | B1 | 11/2007 | Peter |
| 7,392,616 | B1 * | 7/2008 | Bagby .................. 47/65.9 |
| 7,607,257 | B2 | 10/2009 | Goldberg et al. |
| 9,363,952 | B2 | 6/2016 | Zak et al. |
| 9,439,370 | B2 | 9/2016 | Donnelly et al. |
| 2003/0106262 | A1 | 6/2003 | Lai |
| 2004/0010970 | A1 * | 1/2004 | Baumann ............... 47/65.5 |
| 2004/0148855 | A1 * | 8/2004 | Caron .................. 47/80 |
| 2005/0000159 | A1 | 1/2005 | Billette |
| 2005/0011124 | A1 | 1/2005 | Sanderson |
| 2008/0072492 | A1 | 3/2008 | Olson |
| 2008/0110089 | A1 | 5/2008 | Spray |
| 2009/0031629 | A1 * | 2/2009 | Riesterer ............ A01G 9/02 47/66.7 |
| 2009/0077873 | A1 | 3/2009 | Petersen et al. |
| 2010/0077660 | A1 | 4/2010 | Messano |
| 2011/0036006 | A1 * | 2/2011 | Griebel ............ A01G 27/06 47/81 |
| 2011/0131879 | A1 * | 6/2011 | Altendorfer et al. ...... 47/81 |
| 2011/0162272 | A1 | 7/2011 | Junkeer |
| 2012/0060415 | A1 | 3/2012 | Harbaugh |
| 2013/0269250 | A1 | 10/2013 | Hung |
| 2014/0020293 | A1 | 1/2014 | Raffaele |

\* cited by examiner

SELF-WATERING TWO-PIECE PLANTER

CROSS-REFERENCES TO RELATED APPLICATIONS

None.

BACKGROUND

Field of the Invention

This invention relates to containers used for growing plants, specifically to a self-contained and low-maintenance two-piece planter that provides a significantly longer self-watering time period than is obtainable from all known prior art self-watering systems for container-grown plants in current use today. Although the illustrations herein show a planting container having a circular cross-sectional configuration, the word "planter" is generally used hereafter in this invention disclosure without any intent of size or shape limitation, as multiple sizes and cross-sectional configurations are contemplated according to the size, type, and/or number of plants used therewith, as well as the decorative effect or statement desired in its selected location of use. Furthermore, depending upon the type and size of plants grown in the present invention two-piece planter, indoor use thereof may permit minimum maintenance-free periods of several months, with outdoor use permitting even longer maintenance-free periods when the two-piece planter is positioned to benefit from rainwater replenishment, and if it rains often enough, no other water refill of its lower member will be required. Another advantage of the two-piece planter is that no municipal power or water supply connections are needed for its function. It also has a sturdy construction and design that together allow easy installation and use of the present invention two-piece planter in and around public places, such as but not limited to, shopping malls, commercial buildings, hotels, convention centers, and college campuses. Indoor and outdoor residential use by families and individuals are also considered important applications of the present invention and within its contemplated scope.

The most preferred embodiments of the two-piece planter of the present invention comprise an upper member supported by a lower member that is configured to hold water or nutrient/fluid, with the proportion of nutrient/fluid to soil in the present invention at least 2:1, and most preferably approximately 4:1. When a 4:1 nutrient/fluid-to-soil ratio is used in the present invention two-piece planter, the self-watering time for plants grown indoors is at least two to three months, and longer self-watering time periods have been demonstrated for plants with low fluid requirements and those two-piece planters located outdoors and situated to receive at least occasional rainwater replenishment. The upper member of the most preferred embodiment of the present invention is easily and readily removable from its lower member (unless the upper member is large in size and the weight of the fluid-saturated soil and plants therein makes it too heavy for one person to easily lift), with the connection between the upper and lower members provided by a strong and stable double-wall/double-ledge connection. A bottom perimeter cutout/notch on the lower exterior edge of the upper member provides a vertically-extending wall that is configured to engage the top surface of a small interior rim (the first horizontally-extending ledge) on the lower member that is positioned a small spaced-apart distance below the lower member's top edge. The cutout/notch area also provides a stop, overhang, or inverted ledge (the second horizontally-extending ledge in the double-wall/double-ledge connection) that is in substantially perpendicular orientation to the vertically-extending wall and becomes wedged against the top edge of the lower member for secure positioning of the upper and lower members against one another when the upper member is lowered into its desired position of use and it becomes supported by the lower member. For aesthetic purposes, the double-wall/double-ledge connection also provides a nearly seamless connection of the upper member to the lower member, which is not readily evident during the casual observation of passersby. In addition, the upper member is configured generally as a tray and has a perforated bottom surface that allows surplus rainwater not needed immediately by plants to move downwardly via gravity into the lower member for storage. The upper member also has a top perimeter edge optionally having sturdy design and construction, in addition to a fill-tube upwardly depending from its bottom surface for convenient routine fluid/nutrient replenishment without separation of upper and lower members, and also for prompt and easy fluid/nutrient level assessment without having to move the upper member or otherwise disturb plants and their support medium in the upper member. Fluid-permeable material covers the perforations and blocks entry of the soil or other plant support medium into the lower/base member. Also, at least one wicking member is positioned on the fluid-permeable material (under the soil or other plant support medium) with a portion of it extending through the fluid-permeable material and one or more of the perforations in the bottom surface of the upper member tray (with multiple wicking members each typically inserted through a different perforation) to gradually draw nutrient/fluid from the lower member upwardly into soil or other medium in the bottom surface of the upper member that supports plant roots. Since its perforations allow surplus rainwater to leave the upper member plant tray and the wicking member or members only bring fluid into the upper member from the lower member until fluid saturation of the soil or other growth medium occurs, over-watering of plants grown in the upper member is not possible, an important objective and advantage of the present invention.

In addition, the lower member always has at least one overflow hole near its top edge and under the interior rim or ledge to prevent fluid therein from blocking the downward flow of excess rainwater into the lower member, which could otherwise saturate plant roots and harm them. In very large present invention two-piece planters, lower members may also have a lower fluid drain opening (capped or otherwise sealed unless needed for drainage use). Plants are typically established in a soil or other growing/support medium distributed within the upper member tray, however plants may also be in pots supported by the present invention upper member as long as the pots allow plant roots to uptake water or nutrient/fluid at a rate that sustains plant growth. In addition, it is contemplated for preferred embodiments of the present invention to be manufactured in several sizes to accommodate differing sizes and arrangements of container-grown plants, as well as comprise differing colors, differing shapes, differing surface textures, and/or other aesthetically pleasing decorative enhancements for residential use as well as public display. Advantages of the present invention two-piece planter include structure that provides a constant/steady supply of water and fertilizer to plants, easy cleaning, no municipal power or water supply connections, significantly longer self-watering time periods than known prior art self-watering containers, durable construction, and easy/prompt installation and assembly.

Description of the Related Art

People enjoy having plants as a part of their surroundings, but depending upon their location, plants may require a lot of maintenance. Also, in heated and air-conditioned buildings, humidity is generally low, and more frequent watering of indoor plants is typically needed. Furthermore, indoor temperature, sunlight level, air drafts, and positioning near a door that subjects a plant to frequently changing local conditions, can have a significant affect on a plant's need for water and nutrients, and lead to additional time spent on planter monitoring and/or maintenance. Container-grown plants that are located outdoors and in patio areas can be subjected to even more variation in ambient temperature, sunlight level, and air movement, all of which will affect plant moisture requirements. The goal of the present invention is to provide a means of eliminating the daily labor that would otherwise be needed to keep container-grown plants and flowers properly irrigated for a significantly longer self-watering time period than is obtainable from all known prior art self-watering systems for container-grown plants in current use today. While irrigation devices and systems are known for container-grown plants, no device or system is known with the same structure, same wicking system, or all of the features and advantages found in the present invention.

The prior art invention thought to be the closest to the present invention is disclosed in U.S. Patent Application Publication 2008/0302002 to Schmidt (2008), which also provides an irrigation device for a planter. However, there are many important structural differences between the Schmidt invention and the present invention, which allow the present invention structure to provide advantages that the Schmidt invention cannot. First, the present invention is a self-contained assembly and comprises a lower member configured as a reservoir and an upper member configured as a plant-holding tray, with the tray being supported by an interior rim (functioning as a horizontally-extending ledge) that is formed into the upper interior surface of the lower member near its top edge. In contrast, and as shown in Schmidt's FIG. 5, the Schmidt invention is integrated into a planter and comprises two vertically-oriented spacers 51 and 51 positioned in the bottom of a planter, in addition to a horizontally-extending plate 50 supported upon the spacers that defines a bottom volume that can be used as a water supply volume. Since the present invention is a self-contained apparatus, its upper member and lower member can be promptly and cleanly separated from one another without delay, saving material and labor cost in commercial applications. In contrast, for the Schmidt invention, with its growth medium, water, spacer, and horizontal plate 50 all integrated into a planter, each would have to be individually removed (soil and plant/root disruption would also occur), a task that could not be conducted as efficiently and cleanly as when the present invention assembly is used. This provides the present invention with an important and significant advantage over the Schmidt invention.

A second important difference between the present invention and the Schmidt invention involves water/fluid delivery. In the present invention, at least one wicking member is used, and rainwater replenishment of its lower member is contemplated in outdoor applications. In contrast, the Schmidt invention has a pump activated when a humidity sensor placed into the soil above its plate 50 detects moisture below a pre-determined threshold level, with the quantity of water delivered to the soil by a hose 46 being also fixed in advance. Furthermore, in addition to the moisture readings periodically taken that can result in pump activation if the moisture reading falls below a desired level, the Schmidt sensor may also be instructed to take a humidity measurement after water delivery via its hose 46 is complete. Then, if the Schmidt invention detects that the time between successive pump activations increases, its controller will lessen the amount of water delivered during each pump activation, and conversely, if the time between successive pump activations decreases, the Schmidt controller will increase the amount of water delivered for each pump activation, thus attempting to maintain a more uniform range of moisture for plant growth and reducing the probability of excess moisture returning to its water supply volume for recycling. Thus, the Schmidt operation does not store and later use surplus rainwater, but instead prevents pump activation until humidity readings indicate that plants again need moisture. In contrast, the present invention has tray perforations that permit surplus rainwater to enter its lower member and relies upon rainwater for extension of its self-watering time period in outdoor applications.

A third important difference between the present invention and the Schmidt invention is access to the water or nutrient/fluid in the base member or fluid reservoir. Thus, should there be a need to inspect the interior of its supporting lower/base member or conduct maintenance, the present invention's upper member can be readily lifted from the supporting lower member without disturbing the plant(s), the growth/support medium, fluid-permeable material, or the wicking member(s) associated with its upper member. In contrast, should a pump malfunction occur, the Schmidt invention's miniature irrigation unit 30 cannot be removed from the soil and water supply volume built into an associated planter without disturbing its plate 50 and the spacers supporting plate 50, thus making withdrawal of the Schmidt submersible pump from its usable location messy and time-consuming, and unless at least some soil, plants, and plant root structure are first removed from the area around recess 54 in non-woven water-permeable material 53, soil that is otherwise prevented from entering the water supply volume by material 53 might then be allowed to pass through recess 54 and adversely affect subsequent pump operation.

In addition, larger embodiments of the present invention may have a lower drain hole (which is capped or otherwise sealed unless needed for drainage use), and one or more over-fill prevention holes underneath its interior rim that would allow a contingency for excess fluid (due to excess rain or overfilling) in the lower member to be removed instead of being allowed to move upwardly through the perforated bottom surface of the upper member where the excess fluid could potentially dislodge the growth/support medium and/or plant/plants from their preferred positioning, or prevent needed air from reaching plant roots. In contrast, the Schmidt invention does not disclose structural features addressing any of these potentially encountered contingencies. No other planter is known that functions in the same manner as the present invention, has the same structure disclosed herein, or provides all of the present invention's advantages.

BRIEF SUMMARY OF THE INVENTION

It is the primary object of this invention to provide a self-contained, low-maintenance, and self-watering two-piece planter for facilitated plant growth that provides a significantly longer self-watering time period than is obtainable from all known prior art self-watering systems for container-grown plants in current use today and eliminates the daily labor that would otherwise be needed to keep container-grown plants and flowers properly irrigated. It is a further object of this invention to provide a self-watering two-piece planter for facilitated plant growth that permits lower member fluid replenishment without movement or removal of plants, or their growth/support medium. Another object of this invention is to provide a self-watering two-piece planter for facilitated plant growth that has strong and stable connection between is upper and lower/base members, which is not readily visible to passersby for enhanced decorative appeal. It is also an object of this invention to provide a self-watering two-piece planter for facilitated plant growth that allows fast and easy upper member removal from its supporting lower member, and fast and easy subsequent re-installation into its desired position of use. A further object of this invention is to provide a self-watering two-piece planter for facilitated plant growth that has upper member construction allowing excess rainwater to pass through it and enter the supporting lower member beneath it for rainwater replenishment of the lower member and extension of self-watering time periods in outdoor applications. It is also an object of this invention to provide a self-watering two-piece planter for facilitated plant growth which has an upper member constructed for holding one or more plant growth pots, or in the alternative may contain growth/support medium distributed directly into the upper member tray for plant support, although having plant roots directly in the upper member tray and supported by soil or other growth/support media is most preferred. It is a further object of this invention to provide a self-watering two-piece planter for facilitated plant growth having irrigation means that evenly distributes fluid to differing portions of the upper member tray. In addition, it is an object of this invention to provide a self-watering two-piece planter for both indoor and outdoor applications, as well as residential and commercial use, such as but not limited to shopping malls, lobbies, small parks, decorative entrances to public and private buildings, parking garages, commercial buildings, hotels, hospitals, convention centers, schools, and college campuses.

The present invention, when properly made and used, provides a self-contained two-piece planter that allows self-watering of a plant or plants positioned with their roots supported by an upper member that is removably positioned upon a supporting lower member having a proportionately larger fluid-holding interior volume, to eliminate much of the daily labor that would otherwise be needed to keep container-grown plants and flowers properly irrigated. Since the proportion of nutrient/fluid in the lower member of the present invention to soil in its upper member tray is at least 2:1, and most preferably approximately 4:1, the self-watering time for plants grown indoors is extended to at least two to three months, and longer for plants with low fluid requirements and two-piece planters used outdoors that experience rainwater refill, resulting in a significantly longer self-watering time period than can be achieved with all known prior art self-watering systems for container-grown plants in current use today. After the present invention's lower member is filled with water or nutrient/fluid, the present invention upper member (with the cutout/notch formed in its exterior perimeter bottom surface) is lowered onto top edge of the lower member, as well as the top surface of an interior rim near the top edge. This forms a strong and stable double-wall/double-ledge connection between the upper and lower members (the double-wall/double-ledge connection includes engagement with a circumferential rim near the top interior surface of the lower member). Multiple sizes and shapes for upper members and lower members are contemplated according to plant needs, including substantially circular cross-sectional configurations, that of a rectangular planter box, and/or other non-circular and non-rectangular cross-sectional configurations such as but not limited to hexagons and octagons. Furthermore, since the volume of support/growth media used in upper members of the present invention confines plant root growth, transfer of maturing plants to larger planters and in-ground sites is also facilitated. An optional lower drain opening in the lower member can be capped or otherwise sealed until needed for use with a threaded cap, plug, or other similar means, should an application require such a drain opening for maintenance purposes, such as might be indicated by a need for winterizing very large embodiments of the present invention. Furthermore, although its lower member may need periodic water/nutrient replenishment every few months, no municipal power or water supply connections are needed for proper function of the present invention. At least one wicking member extends upwardly from the supporting lower member and into the supported upper member tray via one or more perforations in the upper member's bottom surface, and fluid-permeable material is placed on the perforated bottom surface to prevent soil infiltration downwardly into the nutrient/fluid in the lower member.

Furthermore, in the most preferred embodiments of the present invention the fill-tube attached to the upper member tray is typically used for adding water or nutrient/fluid to the lower member when needed, and upper member removal is not routinely required. In addition, the fill-tube can also be used for fluid/nutrient level assessment in the lower member without having to move the upper member tray or otherwise disturb plants and their support/growth medium. Also, in many present invention applications the top of the fill-tube will extend above the top edge of the upper member's perimeter wall to reduce the opportunity for blockages caused by entry therein of soil or other plant growing media, however, it is also considered to be within the scope of the present invention for the fill-tube to have a height dimension substantially the same as, or less than, the height dimension of the upper member. In addition, soil or plant growth support media is often mounded toward center of upper member, although center mounding is not critical. Thus, the nutrient/fluid needed by plants daily is continuously transferred upwardly from the lower member into the upper member by the wicking member or members and distributed upwardly through the growth/support medium containing plant roots, with any excess rainwater in two-piece planters used outdoors moving downwardly via gravity through the fluid-permeable material and also through the bottom surface perforations of the upper member tray into the lower member for storage and subsequent plant irrigation use. In addition, the number of wicking members varies according to the size of the upper member, the ambient temperature and other ambient conditions (such as but not limited to drafts and wind) in the vicinity of the upper member, as well as the size, age, number, type, and variety of plants grown in the upper member. Also, the supporting lower member may have one or more over-fill prevention holes under its tray-supporting and inwardly-projecting interior rim/ledge, to prevent nutrient/fluid in the lower member from ever blocking downward flow of excess fluid in the upper member through its perforations, which otherwise could saturate plant roots and harm them. However, use of one over-fill prevention hole is preferred for aesthetic purposes and for the connection between the upper member and its supporting lower member to be virtually seamless. When one over-fill prevention hole is used, the present invention two-piece planter is typically rotated until the over-fill prevention hole becomes positioned toward a wall or other adjacent object, so that the over-fill prevention hole remains out-of-view as much as possible. Applications include, but are not limited to, use for daily self-watering of plants in and around residential homes, shopping malls, commercial buildings, hotels, convention centers, and college campuses.

BRIEF DESCRIPTION OF THE SEVERAL VIEWS OF THE DRAWINGS

FIG. 3 is a exploded section view of the first preferred embodiment of the present invention two-piece planter showing an upper member having a sturdy top edge, a perforated bottom surface, and a fill-tube, a lower member having an over-fill prevention hole near its top edge, fluid-permeable material used within the upper member for substantially covering its perforated bottom surface, and one wicking member in a loosely-coiled configuration that distributes fluid/nutrient substantially over the fluid-permeable material during use, with one of the ends of the wicking member or members extending downwardly for insertion through one perforation each in the bottom surface of the upper member and the fluid-permeable material so that it can reach fluid/nutrient in the lower member and transport the fluid/nutrient into the upper member to roots of plants supported by growing/support media distributed in the upper member tray.

FIG. 4 is a section view of a second preferred embodiment of the present invention showing an upper member supported solely by the lower member's interior rim and not by its top edge, an over-fill prevention hole near the top perimeter edge of the lower member and positioned so that rising fluid in the lower member will never come in direct contact with the bottom surface of the upper member, with FIG. 4 also showing the upper member's optionally sturdy top edge and its preferably upwardly-tapering fill-tube that provides more volume within the upper member for plants, fluid-permeable material substantially covering the perforated bottom surface of the upper member, and one wicking member that is distributed substantially over the fluid-permeable material with one of its ends extending through a perforation in the bottom surface of the upper member that is aligned with a perforation in the fluid-permeable material so that it can reach fluid/nutrient in the lower member and transport fluid/nutrient into the upper member to roots of plants supported by growing media distributed therein.

COMPONENT LIST

1—first preferred embodiment of two-piece planter
1'—second preferred embodiment of two-piece planter
2—upper member of planter 1 and 1'
3—lower member of planter 1 and 1'
4—over-fill prevention hole in lower member 3
5—optionally sturdy top edge of upper member 2
6—fill-tube (for adding nutrient/fluid to lower member 3 without separation of upper member 2 from lower member 3, and also used for fluid/nutrient level assessment in lower member 3 without having to move or otherwise disturb plants and growth media in upper member 2)
7—center bore through fill-tube 6
8—wicking member having a first end with a flat coiled configuration and a second opposed end having an elongated configuration, as shown in FIGS. 2-4
9—fluid-permeable material
10—end of wicking member 8 positioned within lower member 3
11—double-wall/double-ledge connection between upper member 2 and lower member 3 that is provided by engagement of 11A and 11B with one another
11A—interior rim/ledge of lower member 3
11B—cutout/notch area in bottom perimeter edge of upper member 2
12—perforations used as fluid drain holes in upper member 2
13—enlarged holes in upper member 2 used for extension of a portion of wicking member 1 into lower member 3
14—hole in fluid-permeable material 9 used for passage of a wicking member 8 into lower member 3
15—hole in fluid-permeable material 9 used for insertion of fill-tube 6
16—top edge of lower member
17—inverted ledge of cutout/notch 11B
18—bottom edge of the vertically-extending wall portion in cutout/notch 11B

DETAILED DESCRIPTION OF PREFERRED EMBODIMENTS

Figure 1:
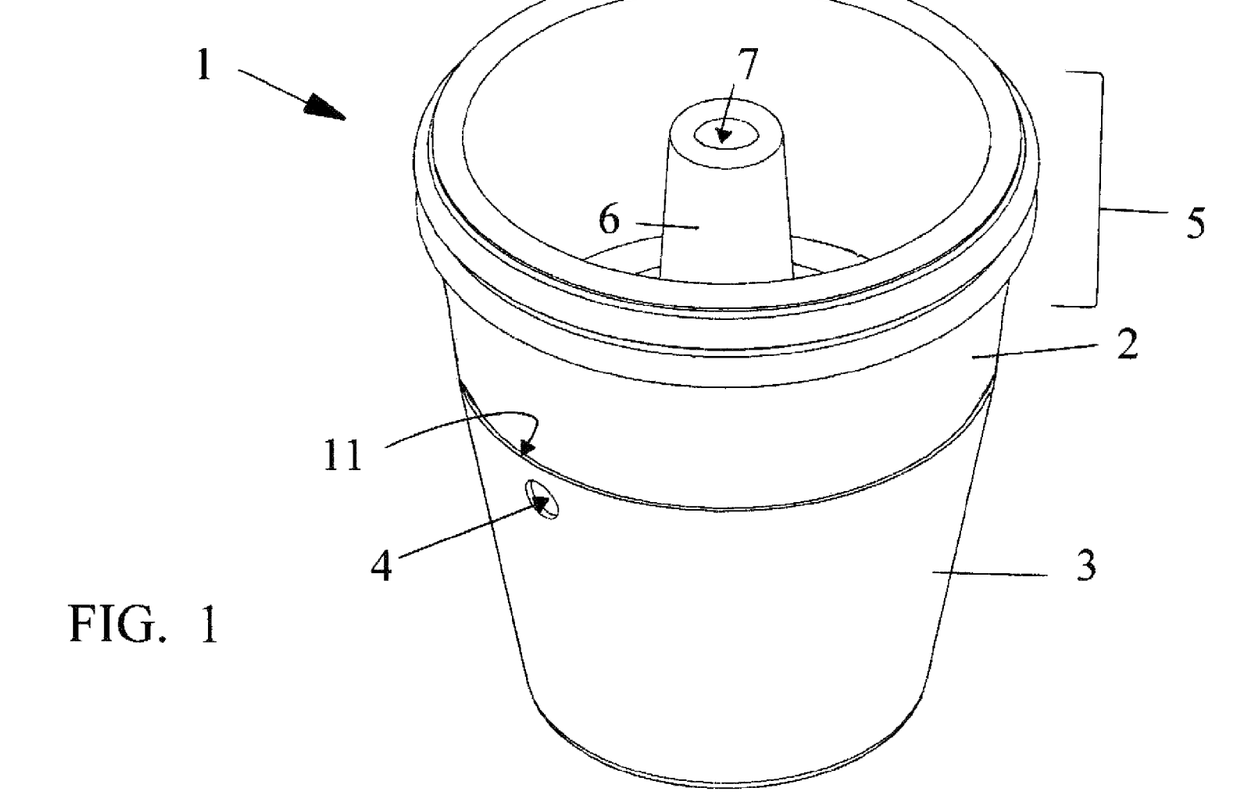
FIG. 1 is a perspective view from the top of a first preferred embodiment of the present invention two-piece planter in an assembled configuration showing its upper member supported by its lower member, an over-fill prevention hole in the lower member near its top edge, and the upper member having an optionally-sturdy decorative top edge and a fill-tube.
Figure 2:
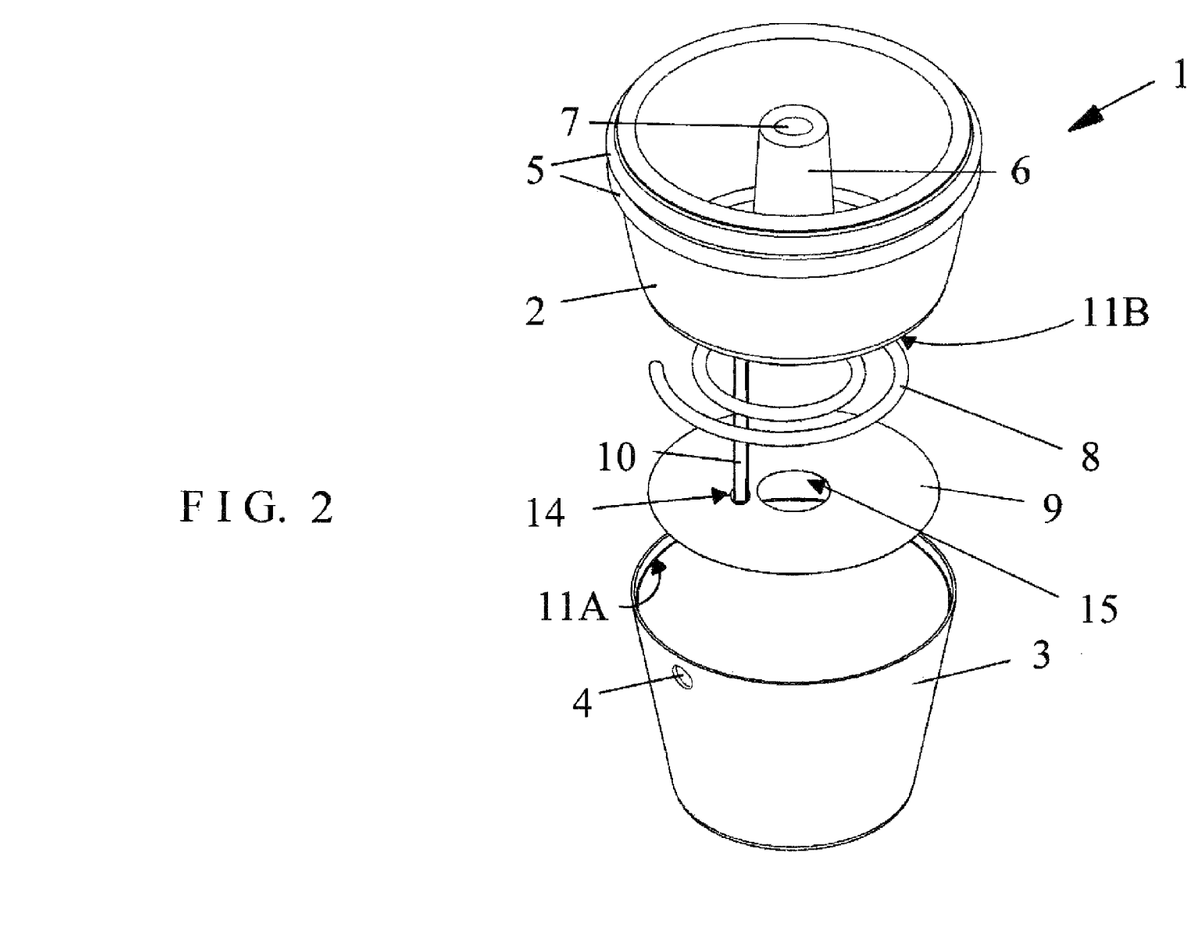
FIG. 2 is an exploded view of the first preferred embodiment of the present invention two-piece planter showing its upper member with a top edge with sturdy construction, one wicking member, fluid-permeable material having a large opening for insertion therethrough of the fill-tube and a smaller hole used for insertion of a wicking member, and a lower member having an interior rim or ledge near its top surface, as well as one over-fill prevention hole near its top edge.
Figure 3:
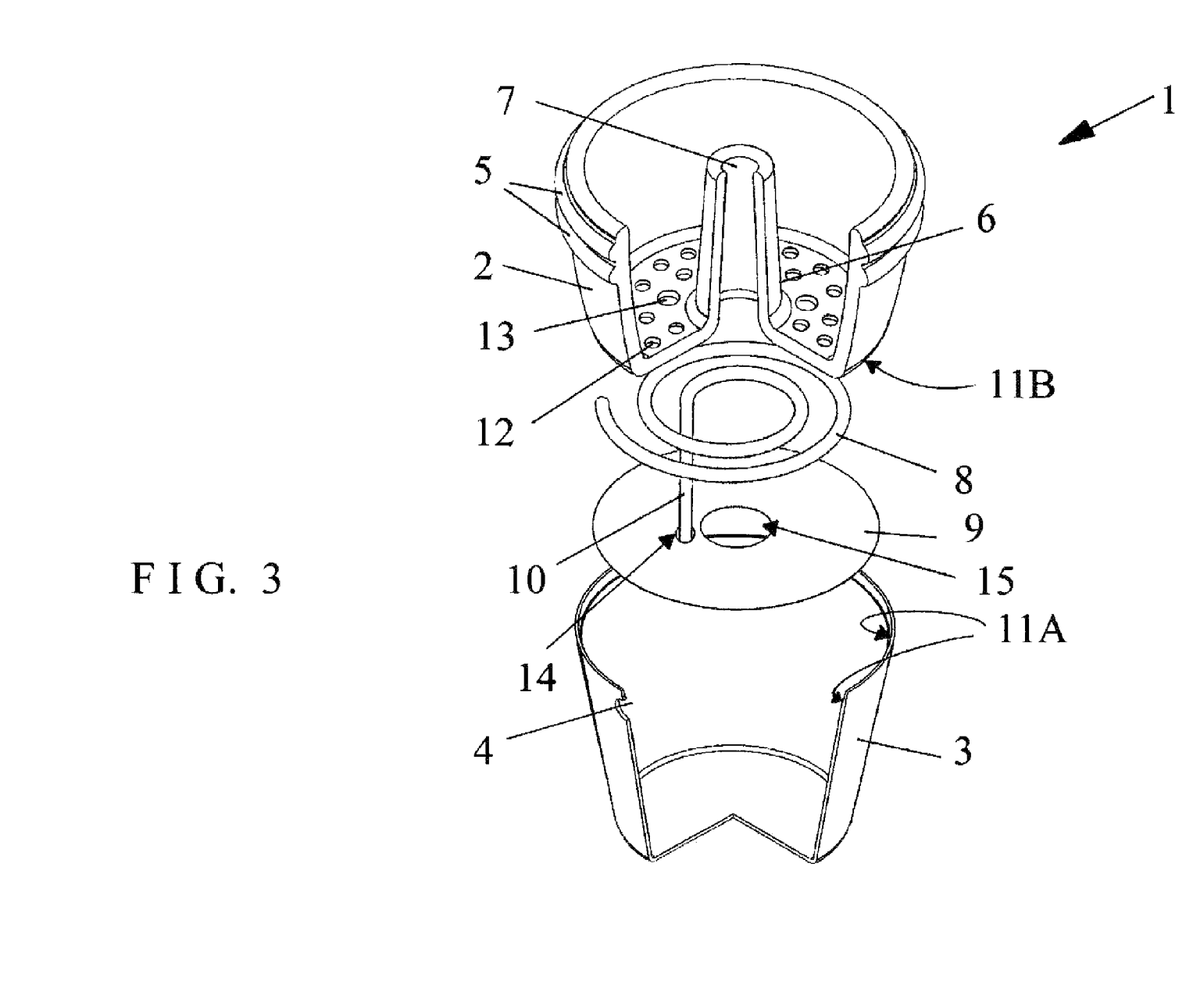
Figure 4:
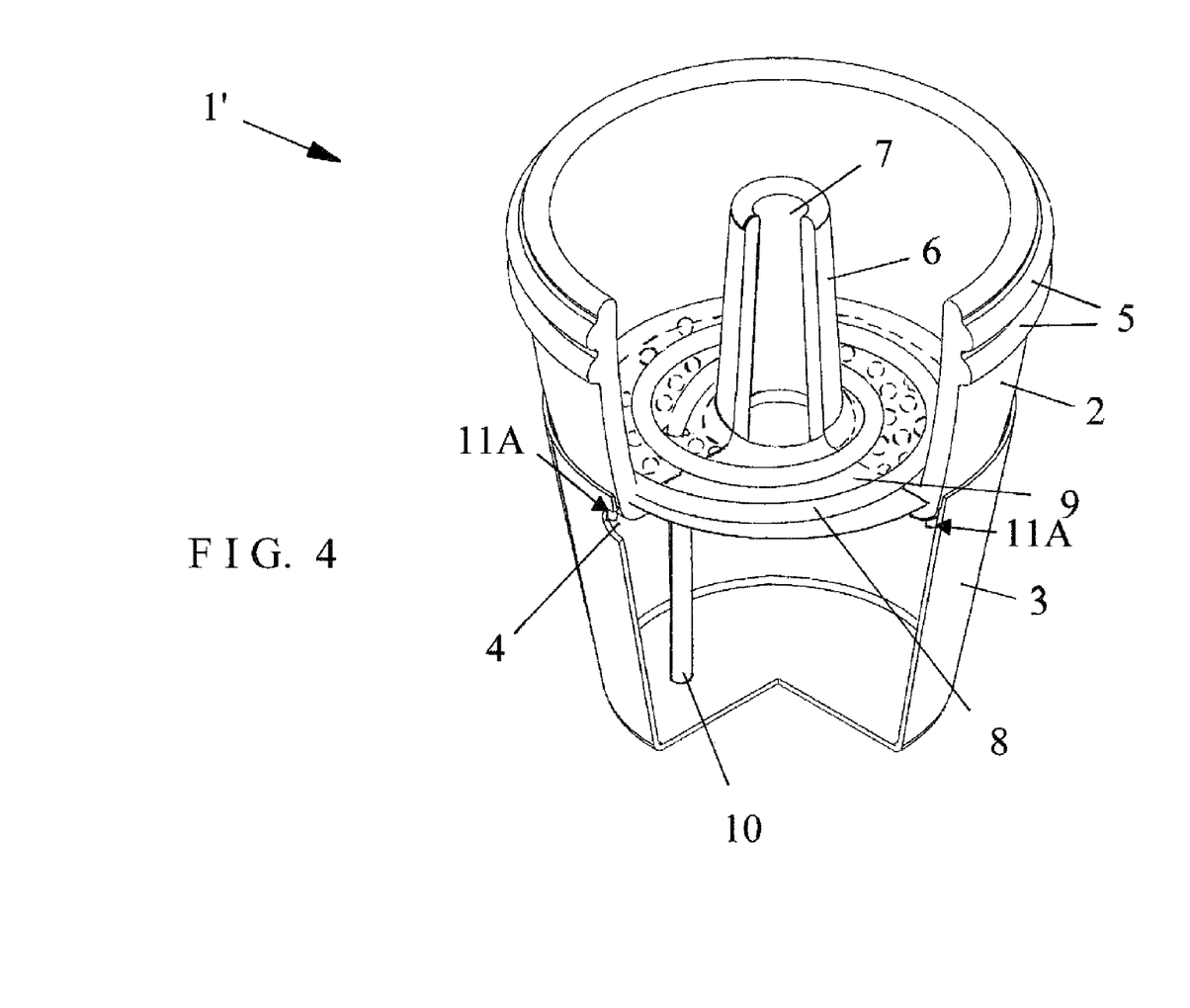

FIGS. 1-6 show two preferred embodiments of the present invention two-piece planter (1 and 1') that provide a significantly longer self-watering time period than is obtainable from all known prior art self-watering and self-contained systems for container-grown plants in current use today. FIGS. 1-3 and 5-6 show a first preferred embodiment (1) wherein the connection between the upper member 2 and lower member 3 is a strong and stable double-wall/double-ledge configuration 11, with FIG. 4 showing a second preferred embodiment (1') wherein the top surface of the interior rim 11A of lower member 3 provides the sole ledge used as a part of the connection between upper member 2 and lower member 3. Two-piece planters (1 and 1') each comprise an upper member 2 configured as a tray for holding plants and their growing/support medium, (or in the alternative potted plants) and a lower member 3 having a closed bottom surface and side walls that define a fluid-holding interior. The accompanying illustrations show upper member 2 having a top edge 5 with sturdy construction (which is optional). FIGS. 3 and 4 further show upper member 2 having a bottom surface with perforations 12 employed as drain holes for excess rainwater entering upper member 2 that cannot be immediately used by plant roots, so that gravity transfers the rainwater to lower member 3 for storage therein until it can be moved by wicking member or members 8 to upper member 2 for subsequent use by plants. Wicking member or members 8 in the two-piece planters 1 and 1' enter upper member 2 through one or more perforations 12 (or optionally via enlarged perforations 13) and one or more holes 14 made through fluid-permeable material 9 specifically for that purpose and which are only slightly larger than the configuration and dimension of the wicking member intended for use therewith. In addition, two-piece planters 1 and 1' further have a fill-tube 6 upwardly depending from the bottom surface of upper member 2. The top of fill-tube 6 may be positioned above the top edge of upper member 2, but is not limited thereto and may be the same height as the top edge of upper member 2, or shorter. Fill-tube 6 typically has an upwardly tapering configuration, with soil and other plant growing media mounded against it, although not limited thereto. Two-piece planters 1 and 1' also have fluid-permeable material 9 covering perforations 12 (as well as unused enlarged holes 13 not having a wicking member 8 extending through it), a lower member 3 with an interior ledge/rim 11A configured to support engage a small perimeter portion of the bottom surface of upper member 2 for its support, and upper member 2 also having a cutout/notch 11B (providing an inverted ledge 17) around the perimeter of its bottom surface that allows the bottom edge 18 of a downwardly-extending portion of upper member 2 adjacent to inverted ledge 17 to rest upon the top edge of the interior rim 11A of lower member 3 and the inverted ledge 17 of upper member 2 to become wedged against the top edge of lower member 3.

In addition to structural considerations needed for upper member 2 support, the structure and materials used for lower member 3 must also be suitable for holding fluid/nutrient for extended periods of time without warping, sagging, or other structural alteration or modification. In addition, two-piece planters 1 and 1' further have at least one wicking member 8 positioned on material 9 and distributed substantially across material 9, with at least one end 10 extending through one of the enlarged holes 13 to draw nutrient/fluid (not shown) from lower member 3 upwardly into soil or other plant growing medium (not shown) supported by upper member 2 around plant roots (not shown). The thickness of fluid-permeable material 9, the number of layers used, and the type of fabric or other material or materials used as a part of fluid-permeable material 9 may vary according to the flow rate of nutrient/fluid needed from lower member 3 to upper member 3 to properly irrigate plants supported by upper member 2. Plants may be in drainable pots supported by upper member 2, or plant roots may be established in a growth or support medium (not shown) distributed within the tray-like interior surface of upper member 2. In addition, it is contemplated for preferred embodiments of the present invention to be manufactured in several sizes to accommodate differing sizes and arrangements of container-grown plants, as well as comprise differing colors, differing shapes, differing surface textures, and/or other aesthetically-pleasing decorative enhancement. Applications include, but are not limited to, daily self-watering of plants in and around residential homes, shopping malls, commercial buildings, hotels, convention centers, and college campuses. Advantages of the present invention two-piece planter 1 include structure that provides a constant/steady supply of water and fertilizer to plants, easy cleaning, no municipal power or water supply connections, significantly longer self-watering time periods, durable construction, and easy/prompt installation and assembly.

FIG. 1 is a perspective view from the side of the first preferred embodiment of two-piece planter 1 in the present invention in an assembled configuration showing its upper member 2 supported by its lower member 3. One over-fill prevention hole 4 can be seen in lower member 3 near its top edge, which is preferred, however, more over-fill prevention holes 4 can be present. Since for aesthetic purposes it is contemplated for the connection of upper member 2 and lower member 3 to nearly seamless when casually viewed, when one over-fill prevention hole 4 is present, it is typically is rotated to the back or otherwise given less conspicuous positioning. The elevation of over-fill prevention hole or holes 4 must be determined to prevent the fluid/nutrient in lower member 3 from blocking the downward gravity-assisted flow of surplus/excess fluid/nutrient from upper member 2, through fluid-permeable material 9, and into lower member 3. FIG. 1 further shows the upper member 2 in the first preferred embodiment of the present invention two-piece planter 1 having a top perimeter edge/portion 5 with sturdy construction that resists damage and cracking when left for long periods of time unattended in public places where it could be at risk for repeat contact by a variety of objects or people moving by or around it. Although the configuration of top perimeter edge/portion 5 shown in FIG. 1 is preferred, it may also be different from that shown in FIG. 1, as long as it has a strong and sturdy construction that minimizes contact damage and cracking. FIG. 1 also shows a fill-tube 6 within upper member 2 with a gradually tapering configuration upwardly toward its top distal end that minimizes interference with foliage in the plants rooted in upper member 2. The upward tapering is also preferred, but not critical. After the initial filling of lower member 3 with nutrient/fluid, the hole 7 through fill-tube 6 may be used for occasional nutrient/fluid replenishment in lower member 3 without any need for separation of upper member 2 from lower member 3. In addition, the hole 7 through fill-tube 6 can also be used for fluid/nutrient level assessment in lower member 3 shown in FIG. 1 without having to move upper member 2 or otherwise disturb plants and their growing/support medium supported by upper member 2. The hole 7 through fill-tube 6 may also be used for occasional addition of nutrients (not shown) lost to plants as they grow. Although FIG. 1 shows two-piece planter 1 having a generally unadorned exterior surface, the exterior surface thereof may vary from that shown for decorative/aesthetic enhancement. In addition, the circular perimeter configurations of upper member 2 and lower member 3 are not critical, and it is also contemplated for two-piece planter 1 to have non-circular perimeter configurations, such as but not limited to that of a rectangle, circle, or hexagon. It is preferred that all materials used in two-piece planter 1 be non-toxic, water resistant, and unaffected by extended exposure to soil and nutrient/fluid. Resistance to breakdown from ultraviolet radiation is also a desirable material consideration for upper member 2 and lower member 3, although not critical.

FIG. 2 is an exploded view of the first preferred embodiment of two-piece planter 1 in the present invention showing a sturdy and durable top perimeter edge/portion 5, one wicking member 8, fluid-permeable material 9 having a large opening 15 for insertion therethrough of fill-tube 6 and a smaller hole 14 used for insertion of a wicking member 8, upper member 2 positioned above lower member 3, and lower member 3 having an interior rim/ledge 11A near its top surface and one over-fill prevention hole 4 close to interior rim/ledge 11A, but sufficiently below it so as not to interfere with gravity assisted flow of surplus/excess fluid/nutrient in upper member 2 downwardly toward lower member 3. It is preferred for interior rim/ledge 11A to extend around the entire interior surface of lower member 3 close to, but at a spaced-apart distance from, its top edge 16 (marked with its numerical designation in FIG. 5). Although FIG. 2 shows a single coiled wicking member 8 positioned above fluid-permeable material 9, the number, configuration, width dimension, and positioning of wicking member 8 may vary from that shown in FIG. 2 as long as the wicking member or members 8 used substantially cover fluid-permeable material 9 for thorough distribution of nutrient/fluid to all parts of the soil or plant growing medium in upper member 2 for uptake by plant roots. Also, although one layer of fluid-permeable material 9 is shown, more than one layer of fluid-permeable material 9 may be used, as long as gravity-assisted movement of surplus rainwater is still permitted through perforations 12 and unused enlarged perforations 13 so that it can be stored in lower member 3 for later plant irrigation use. The size of interior rim 11A near the top surface of lower member 3 should be small so as to not block or diminish gravity-assisted flow of rainwater from upper member 2 to lower member 3, however it should have sufficient width, height, and thickness dimension to provide sturdy support for, and engagement with, portions of the cutout/notch area 11B around the bottom perimeter of upper member 2. Furthermore, the size and configuration of the sturdy top perimeter edge/portion 5 of upper member 2 may vary from that shown in FIG. 2, as long as it remains constructed for resistance to contact damage and cracking.

FIG. 3 is a exploded section view of the first preferred embodiment of two-piece planter 1 in the present invention showing a sturdy and durable top perimeter edge/portion 5, one wicking member 8, fluid-permeable material 9 having a large opening 15 for insertion therethrough of fill-tube 6 and a smaller hole 14 used for insertion of a wicking member 8, upper member 2 having a bottom surface with small perforations 12 used as fluid drain holes and larger perforations 13 used for insertion therethrough of a wicking member 8, and a lower member 3 having an interior rim/ledge 11A near its top surface and one over-fill prevention hole 4 close to interior rim/ledge 11A, but sufficiently below interior rim/ledge 11A so as not to interfere with gravity assisted flow of surplus/excess rainwater in upper member 2 downwardly toward lower member 3. The perforations 12 and 13 in the bottom surface of upper member 2 are merely exemplary and may be proportionally larger or smaller than shown, and have different positioning, as long as they fulfill their intended functions of allowing passage of surplus rainwater not needed by plants supported by upper member 2 to travel downwardly into lower member 3 for later use. FIG. 3 shows interior rim/ledge 11A extending substantially around the entire interior surface of lower member 3. Although FIG. 3 shows a single coiled wicking member 8 positioned above fluid-permeable material 9, the number, configuration, width dimension, and positioning of wicking member 8 may vary from that shown in FIG. 3 as long as it substantially covers fluid-permeable material 9 for thorough distribution of nutrient/fluid to all plant roots in upper member 2. Also, although one layer of fluid-permeable material 9 is shown in FIG. 3, more than one layer of fluid-permeable material 9 may be used, as long as gravity-assisted movement of surplus rainwater not needed by plants rooted in upper member is permitted to exit upper member 2 through its perforations 12 and 13 and become housed within lower member 3 for later plant irrigation use as long as lower member 3 has sufficient empty volume below rim/ledge 11A to contain it. Otherwise, surplus rainwater mixed with other water and nutrient/fluid would exit lower container 3 through its over-fill prevention hole or holes 4. The width, height, and thickness dimension of interior rim 11A near the top edge of lower member 3 should be small so as to not block gravity-assisted flow of rainwater from upper member 2 to lower member 3, however it should be sufficient in dimension to provide sturdy support for, and engagement with, a portion of the cutout/notch area 11B around the bottom exterior perimeter edge of upper member 2. The size and configuration of the sturdy top perimeter edge/portion 5 of upper member 2 is preferred, but may vary from that shown in FIG. 3. The number, configuration, width dimension, spaced-apart distances, and positioning of perforations 12 and enlarged perforations 13 in the perforated bottom surface of upper member 2 may also vary from that shown in FIG. 3. Enlarged perforations 13 are typically used as a passageway for the ends 10 of wicking member or members 8 to enter lower member 3 and contact fluid/nutrient so that it may be transported by wicking member or members 8 in an upwardly direction from lower member 3 into upper member 2 for plant use. Furthermore, the perimeter dimension of upper member 2 is not limited to the circular configuration shown in FIG. 3 as long as it is complementary to that of lower member 3, and the shape, diameter, wall thickness, and height dimension of fill-tube 6 may be different from that shown in FIG. 3, as long as it effectively fulfills its intended functions.

FIG. 4 shows a section view of a second preferred embodiment of two-piece planter 1' in the present invention in its assembled configuration. FIG. 4 show upper member 2 supported by lower member 3 and having an over-fill prevention hole 4 in lower member 3 near its top edge, with positioning that prevents nutrient/fluid in lower member 3 from rising high enough to make contact with the perforations 12 and 13 in the bottom surface of upper member 2. FIG. 4 also shows upper member 2 having a sturdy top perimeter edge/portion 5, a fill-tube 6 with a hole 7 used for occasional fluid/nutrient replenishment in lower member 3 without separation of upper member 2 and lower member 3 and fluid/nutrient level assessment in lower member 3 without having to move upper member 2 or otherwise disturb plants and their support/growth medium supported by upper member 2, fluid-permeable material 9 substantially covering the bottom perforations 12 (shown in broken lines as they are under fluid-permeable material 9) of upper member 2, and one wicking member 8 that is distributed substantially over fluid-permeable material 9 with one of its ends 10 extending through a perforation (12 or 13) in the bottom surface of upper member 2 so that it can reach nutrient/fluid housed in lower member 3 and transport measured amounts of fluid/nutrient into upper member 2 for distribution to the roots of plants (not shown) supported by growing media (not shown) distributed in the upper member 2.

Figure 5:
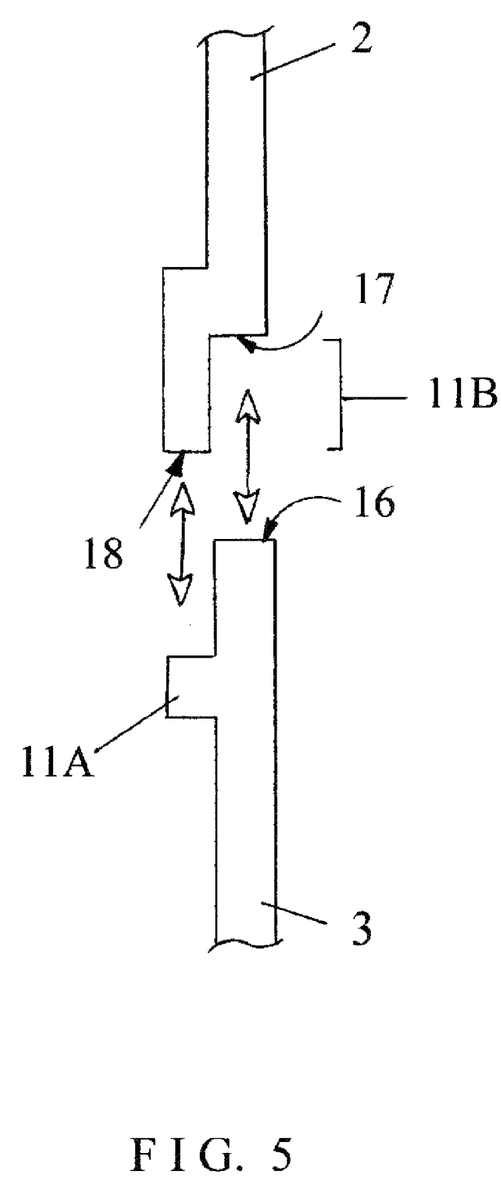
FIG. 5 is an exploded section view of the strong double-wall/double-ledge connection between the upper member and the lower member in the first preferred embodiment of the present invention where the top edge of the lower member contacts substantially all of the inverted ledge of the cutout/notch on the bottom exterior perimeter surface of the upper member, with the bottom edge of the vertically-extending wall portion of the cutout/notch area in the upper member contacting the interior rim/ledge situated below the top edge of the lower member, with two-headed arrows identifying the horizontally-extending surfaces that come into contact with one another during use.
Figure 6:
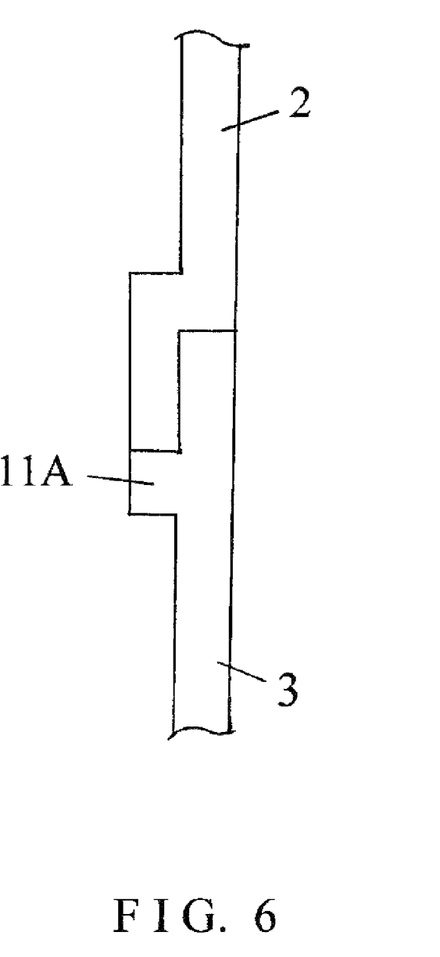
FIG. 6 is a section view showing the upper member and the lower member in FIG. 5 in the assembled condition needed for use.

FIG. 5 is an exploded section view of the strong double-wall/double-ledge connection between the upper member 2 and the lower member 3 in the first preferred embodiment of the present invention two-piece planter 1 where the top edge 16 of lower member 3 contacts substantially all of the inverted ledge 17 of the cutout/notch area 11B on the exterior bottom perimeter of upper member 2, with the bottom edge 18 of the vertically-extending wall portion of cutout/notch area 11B in upper member 2 contacting the top surface of the interior rim/ledge 11A situated slightly below the elevation of the top edge 16 of lower member 3. Two double-headed arrows point to and identify the surfaces (16 and 17, 18 and 11A) that come into contact with one another during present invention use. FIG. 6 is an enlarged section view showing upper member 2 and lower member 3 in the assembled condition needed for extended self-watering use of plants rooted in soil or other growing medium supported by upper member 2.

I claim:

1. A two-piece planter comprising:
an upper member configured as a tray defining an interior volume for containment of plant growth medium, said tray having a top perimeter edge, said tray having a bottom surface with a plurality of perforations, said tray having a fill-tube including a bottom portion upwardly depending from said bottom surface, said tray having an external bottom perimeter edge, said fill-tube defining a cavity having a top end and a bottom end, wherein said fill-tube has an upwardly tapered configuration, wherein said top end of said cavity is narrower than said bottom end of said cavity;
fluid-permeable material covering said plurality of perforations in said bottom surface, said fluid-permeable material preventing said plant growth medium in said tray from moving through said perforations, said fluid-permeable material having at least one first opening and a second opening therethrough, wherein each of said at least one first opening is aligned with one of said perforations in said bottom surface, said fluid-permeable material also having a top surface remote from said plurality of perforations in said tray, wherein said second opening surrounds said bottom portion of said fill-tube, wherein an area and a shape of said second opening are approximately the same as an area and a shape, respectively, of said bottom portion of said fill-tube to allow for insertion of said fill-tube through said second opening;
a lower member made from water impenetrable material and having a closed bottom surface and an interior wall contiguous with said closed bottom surface, said interior wall defining a fluid-holding interior allowing collection of plant irrigating fluid therein, wherein liquid added through said top end of said cavity exits through said bottom surface of said upper member via said bottom end of said cavity and is collected in said fluid-holding interior, wherein said fluid-holding interior of said lower member is larger than said interior volume of said tray, said lower member also having an open top end and an interior rim projecting inwardly from said interior wall, said lower member further having a perimeter configuration larger than that of said bottom surface of said upper member; and
at least one wicking member having a flat coiled end and an opposed elongated end, wherein said elongated end is positioned in said fluid-holding interior of said lower member, wherein said flat coiled end is positioned between said top surface of said fluid-permeable material and said plant growth medium, wherein positioning of said flat coiled end between said top surface of said fluid-permeable material and said plant growth medium allows thorough distribution of plant irrigation fluid received from said opposed elongated end to said plant growth medium in contact with said fluid-permeable material, said opposed elongated end extending into said fluid-holding interior of said lower member through one of said at least one first opening through said fluid permeable membrane aligned with one of said perforations in said bottom surface of said upper member, said two-piece planter also concurrently providing extended self-watering time for plants rooted in said plant growth medium supported upon said fluid-permeable material in said tray.

2. The planter of claim 1 wherein at least one of said perforations in said perforated bottom surface of said upper member is enlarged to accommodate easy insertion therethrough of said at least one wicking member.

3. The planter of claim 1 wherein said lower member further comprises at least one fluid overflow hole positioned at an elevation below that of said interior rim, wherein fluid exits said lower member through said at least one overflow hole when a fluid level of fluid in said fluid-holding interior is at or above said elevation of said at least one overflow hole.

4. The planter of claim 1 wherein said lower member has a lower drain hole.

5. The planter of claim 4 further comprising a threaded cap configured to seal said lower drain hole.

6. The planter of claim 1 wherein said fluid-holding interior of said lower member has a minimum volume of at least two times that of said interior volume of said upper member.

7. The planter of claim 6 wherein said fluid-holding interior of said lower member has a volume that is approximately four times that of said interior volume of said upper member, wherein said extended self-watering time for plants rooted in said plant growth medium supported upon said fluid-permeable material in said tray is at least one month.

8. The planter of claim 1 wherein said external bottom perimeter edge of said upper member further comprises an inverted L-shaped notch providing an inverted ledge and an adjacent substantially vertical notch surface, and said interior wall of said lower member further comprises a top edge, and further wherein when said upper member is supported by said lower member, said inverted ledge of said upper member is in contact with said top edge of said lower member's interior wall and said substantially vertical notch surface becomes wedged against a portion of said interior wall of said lower member situated above said lower member's interior rim.

9. The planter of claim 1, said upper member having an upper member height dimension, said fill-tube having a fill-tube height dimension that is greater than one half of said upper member height dimension.

10. The planter of claim 9, wherein said fill-tube height dimension is equal to said upper member height dimension.

11. The planter of claim 9, wherein said fill-tube height dimension is greater than said upper member height dimension.

12. The two-piece planter of claim 1, wherein said second opening is larger than each of said at least one first opening.

* * * * *